United States Patent [19]

Widner

[11] 3,982,441

[45] Sept. 28, 1976

[54] GYRO HAVING FLUIDIC BEARING WITH DUAL ORIFICES AND EXHAUSTS

[75] Inventor: Rayburn K. Widner, Arab, Ala.

[73] Assignee: The United States of America as represented by the Secretary of the Army, Washington, D.C.

[22] Filed: Feb. 28, 1975

[21] Appl. No.: 554,336

[52] U.S. Cl. ............................ 74/5.7; 74/5.12; 308/DIG. 1
[51] Int. Cl.² ............... G01C 19/12; G01C 19/16; G01C 19/26
[58] Field of Search............ 74/5.7, 5 R, 5.12, 5.14, 74/5.1; 308/9, DIG. 1

[56] References Cited
UNITED STATES PATENTS

| | | | |
|---|---|---|---|
| 2,695,199 | 11/1954 | Blizard.......................... | 308/DIG. 1 |
| 2,809,527 | 10/1957 | Annen................................ | 74/5.7 |
| 2,940,318 | 6/1960 | Adams et al................... | 308/DIG. 1 |
| 3,706,231 | 12/1972 | Noar et al.............................. | 74/5.7 |
| 3,807,239 | 4/1974 | Widner et al........................ | 74/5.12 |

*Primary Examiner*—Samuel Scott
*Assistant Examiner*—F. D. Shoemaker
*Attorney, Agent, or Firm*—Nathan Edelberg; Robert P. Gibson; James T. Deaton

[57] ABSTRACT

A gyro which has a fluidic bearing with two radially spaced circles of orifices and two circumferentially and radially spaced exhausts and jet means for producing low pressures in the circumferential exhausts. By using a jet nozzle exhaust control with radial exhaust outlets between two circles of orifices, fluid from one circle of orifices is allowed to exhaust before it can interfere with the other circle of orifices. The fluidic bearing also has exhaust channels between each of the orifices to reduce turbulence and torques present in this area.

6 Claims, 2 Drawing Figures

GYRO HAVING FLUIDIC BEARING WITH DUAL ORIFICES AND EXHAUSTS

DEDICATORY CLAUSE

The invention described herein may be manufactured, used, and licensed by or for the Government for governmental purposes without the payment to me of any royalties thereon.

BACKGROUND OF THE INVENTION

In the past, a single circle of orifices has been used to introduce fluid to fluidic bearings of the type disclosed herein. In a fluidic bearing with a single circle of orifices opening into the fluidic bearing space, converging fluids from orifices on either side can produce turbulence and torques that are undesirable. Also, in high G gyros there is a need for an air bearing that has a set of inlet orifices for supporting the high G forces and another set of orifices that act as centering thrusters.

Accordingly it is an object of this invention to provide a gyro that has a fluidic bearing with two sets of circumferentially arranged orifices and two circumferentially arranged exhaust passages for exhausting the fluid from the inlet orifices.

Another object of this invention is to provide a gyro that has a fluidic bearing in which the outlet passages have the pressures reduced therein by a jet arrangement.

Still another object of this invention is to provide a gyro that has a fluidic bearing with channels in one of the bearing surfaces between each of the orifices to cut down on turbulence and undesirable torques.

Other objects and advantages of this invention will be obvious to those skilled in this art.

SUMMARY OF THE INVENTION

In accordance with this invention, a gyro is provided that includes a rotor and a stator housing with fluidic bearing means defined between the rotor and the stator housing. The fluidic bearing means has a pair of circumferential rings of openings for injecting fluid into the fluidic bearing and a plurality of spaced exhausts for carrying the fluid away. Between the openings of the circumferential rings and the exhausts are exhaust channels to reduce turbulence and torques present in these areas. A jet type pump is connected to the exhausts to produce a low pressure at the exhausts and cause the exhaust fluid from the fluidic bearing to be attracted to the exhausts.

DESCRIPTION OF THE PREFERRED EMBODIMENT

Figure 1:
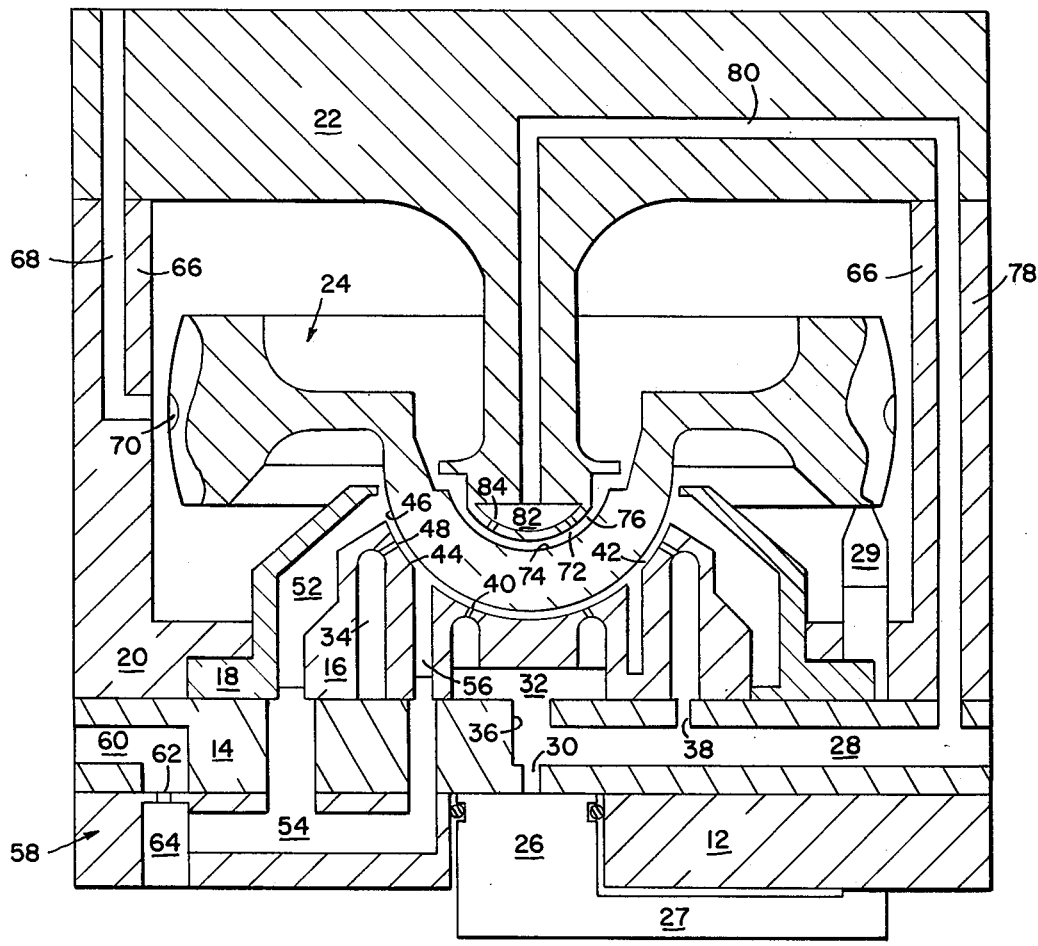
FIG. 1 is a sectional view of a gyro according to this invention.

Referring now to FIG. 1, gyro 10 includes a stator housing made up of base members 12 and 14, bearing mount 16, shroud 18, intermediate section 20 and upper section 22. Rotor 24 is rotatably mounted within the stator housing by fluidic bearing means. Base member 12 has piston 26 mounted therein and a low pressure inlet passage 28 in member 14 communicates fluid to the chamber formed between piston 26 and base member 12 by passage 30. Piston 26 has a plurality of radial arms 27 (only one of which is shown) that are connected to caging members 29 (only one of which is shown). Piston 26 is normally held in the retracted position shown by friction to maintain caging members 29 in contact with a lower surface of rotor 24 to maintain rotor 24 in a caged position until it is desired to place the gyro in operation.

Figure 2:
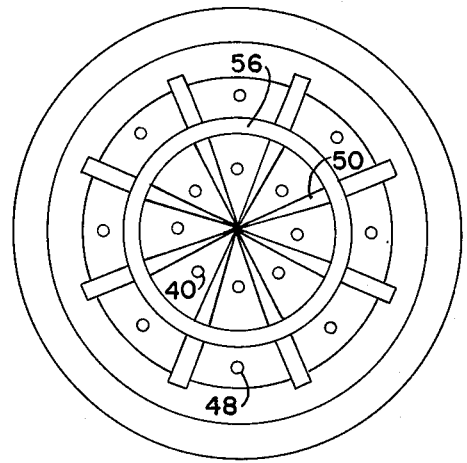
FIG. 2 is a top view of the bearing mount according to this invention.

Stator bearing mount 16 is secured to base members 12 and 14 in a conventional manner and has a first inner chamber 32 defined between base member 14 and the lower surface thereof and a second outer chamber 34 defined between base member 14 and the lower surface thereof. Passage 36 communicates fluid from inlet 28 to inner chamber 32 and passage 38 communicates fluid from inlet 28 to outer chamber 34. The fluid received in chamber 32 is communicated through a plurality of inner circumferentially arranged ports 40 into fluidic bearing space 42 that is defined by the upper concave spherical surface 44 of bearing mount 16 and convex spherical surface 46 of rotor 24. Chamber 34 communicates fluid through a plurality of outer circumferentially arranged ports 48 into bearing space 42. Exhaust channels 50 (see FIG. 2) are located in concave surface 44 between each of ports 40 and 48 to aid in the exhausting of fluid from fluid space 42 and reduce turbulence and torques present in the fluidic bearing space.

Shroud 18 around bearing mount 16 defines an outer circumferential exhaust 52 from fluid bearing space 42 that exhausts into outlet passage 54, and inner circumferential exhaust 56 between inner circumferential ports 40 and outer circumferential ports 48 exhaust into outlet passage 54. Base members 12 and 14 have a jet pump 58 mounted therein that includes inlet passage 60 that is provided with fluid from an appropriate source and jetted through orifice 62 into jet outlet passage 64. The fluid jetting through orifice 62 pass the end of outlet passage 54, which opens into jet outlet 64, creates a suction or low pressure within outlet passage 54 and inner circumferential exhaust 56 and outer circumferential exhaust 52 to attract the exhausting fluid from fluidic bearing space 42. The attraction of this fluid from fluidic bearing space 42 prevents turbulence from the fluid entering at inlet ports 40 and 48 and also prevents the fluid from exhausting around shroud 18 to cause undesirable forces to be exerted on rotor 24. It is also pointed out that orifice 62 and jet outlet 64 are at a 90° angle to outlet passage 54 where outlet passage 54 opens into jet outlet 64 to create the low pressure in passage 54 and exhausts 52 and 56.

Intermediate stator housing 20 has three legs 66 that are integral with member 20 and secured to base members 12 and 14 in a conventional manner. Also, legs 66 are secured at the upper ends thereof to upper housing 22 in a conventional manner. As illustrated, one of legs 66 has an inlet passage 68 that is connected to an external source of fluid to provide fluid through this passage to buckets 70 on rotor 24 to rotate rotor 24 up to speed when desired. It is also pointed out that rotor 24 may be brought up to operating speed by any other conventional means desired.

In some applications, it is desirable to have an upper bearing on the rotor and as illustrated, upper housing 22 has an upper convex spherical surface 72 that forms with concave spherical surface 74 of rotor 24 a fluidic bearing space 76. Fluid for this bearing space is provided from inlet 28 through passage 78 in one of legs 66 to passage 80 in upper member 22 which communicates the fluid into chamber 82 of upper member 22. Fluid from chamber 82 is communicated through a plurality of circumferentially arranged ports 84 into air bearing space 76. The exhausting fluid from air bearing space 76 can also be used for pickoff purposes if desired.

In operation, fluid is supplied to passage 28 for supplying fluid to piston 26 to actuate caging members 29 and supply fluid to fluid bearing spaces 42 and 76 at the same time fluid is supplied to passage 68 to cause rotor 24 to be brought up to speed. Also, fluid is simultaneously provided at inlet 60 to be jetted through orifice 62 and cause a low pressure to be created at inner and outer circumferential exhausts 52 and 56 and attract the exhausting fluid from fluid bearing space 42 and prevent this fluid from exerting undesirable forces on rotor 24. As can be seen, it is obvious that by providing low pressure exhaust 52 and 56 and by providing exhaust channels 50 between the orifices, the exhausting fluid from bearing space 42 is prevented from exerting undesirable forces on the rotor and therefore minimize case erection and increase performance of the gyro. It is also pointed out that the two circles of orifices 40 and 48 receive fluid supply simultaneously from chambers 32 and 34 in bearing mount 16. This fluid flows through inner and outer circumferential ports 40 and 48, across the bearing surface and into the low pressure area in exhaust channels 50 and inner and outer exhausts 52 and 56. The exhausting fluid continues its path through outlet passage 54 and jet exhaust 64. By having exhaust channels 50 between each of orifices 40 and 48 and interconnected to the inner and outer circumferential exhausts, converging fluids from orifices on either side is prevented. If this were not done, undesirable turbulence and torques would be created by converging fluids from the orifices. With this arrangement, each orifice has an individual bearing surface creating a more laminar flow condtion.

The inner circumferentially arranged ports 40 are near the center of the rotor and support a surface more perpendicular to flight "G" forces in the high G portion of the bearing. Outer circumferential ports 48 are side and centering type thrusters.

I claim:

1. A gyro comprising a stator housing, a rotor rotatably mounted in said stator housing by fluidic bearing means, said fluidic bearing means having a plurality of inwardly circumferentially arranged ports that have means for admitting fluid to said plurality of inwardly circumferentially arranged ports and said plurality of inwardly circumferentially arranged ports opening into a fluidic space defined between said rotor and said stator housing, a plurality of outwardly circumferentially arranged ports with means for directing fluid to said plurality of circumferentially arranged ports and said plurality of circumferentially arranged ports opening into the fluidic space defined between said rotor and said stator housing, a first circumferentially arranged exhaust from said fluidic bearing space and being located between said plurality of inwardly circumferentially arranged ports and said plurality of outwardly circumferentially arranged ports, a second circumferentially arranged exhaust located radially outwardly of said plurality of outwardly circumferentially arranged ports, and an exhaust channel between each of said plurality of inwardly circumferentially arranged ports and said plurality of outwardly circumferentially arranged ports and in fluid communication with said first exhaust and said second exhaust.

2. A gyro as set forth in claim 1, wherein means are provided for reducing pressure at said circumferentially arranged exhausts to cause the fluid from the fluidic bearing space to be attracted to said circumferentially arranged exhausts.

3. A gyro as set forth in claim 2, wherein said means for producing reduced pressure at said circumferentially arranged exhausts includes a jet arrangement in which an outlet passage from said circumferentially arranged exhausts communicates at a 90° angle with a jet outlet that receives fluid through a restricted orifice from an inlet passage to cause the fluid being jetted through said orifice and into said jet outlet to cause a low pressure to be produced in said outlet passage and said circumferentially arranged exhausts.

4. A gyro as set forth in claim 3, wherein said fluidic bearing means has a spherical shaped surface on said rotor that mates with a similar spherical shaped surface on said stator housing.

5. A gyro as set forth in claim 4, wherein caging means are provided for maintaining the rotor in a caged position until fluid is provided to said fluidic bearing means, said caging means being actuated by the same fluid as that supplied to said fluidic bearing means.

6. A gyro as set forth in claim 5, wherein said fluidic bearing means includes another spherical surface on said rotor that mates with another spherical surface on said stator housing to define another fluidic bearing space between said rotor and said stator housing, and passage means in said stator housing communicating fluid to said another fluidic bearing space.

* * * * *